(12) United States Patent
Van Poppel

(10) Patent No.: US 6,517,109 B1
(45) Date of Patent: Feb. 11, 2003

(54) FOLDED AIR BAG

(75) Inventor: Jean A. Van Poppel, Romeo, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/992,691

(22) Filed: Nov. 21, 2001

(51) Int. Cl.⁷ .............................................. B60R 21/16
(52) U.S. Cl. ................................................... 280/743.1
(58) Field of Search .............................. 280/729, 740, 280/743.1, 731, 732

(56) References Cited

U.S. PATENT DOCUMENTS

| | | | |
|---|---|---|---|
| 5,249,824 A | * 10/1993 | Swann et al. ............... | 280/729 |
| 5,975,564 A | 11/1999 | Smith et al. | |
| 6,059,312 A | 5/2000 | Staub et al. | |
| 6,086,092 A | 7/2000 | Hill | |
| 6,095,557 A | 8/2000 | Takimoto et al. | |
| 6,247,727 B1 | 6/2001 | Hamada et al. | |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

An air bag (10) includes first and second panels (31, 32) that are substantially identical to each other and that are secured to each other to define a first bag section (30). The first panel (31) has an inflation fluid inlet (38) and the second panel (32) has an inflation fluid outlet (70). The air bag (10) includes third and fourth panels (93, 94) that are substantially identical to each other and that are secured to each other to define a second bag section (90). The third panel (93) is secured to the second panel (32) and is spaced apart from the first panel (31). The third panel (93) has an inflation fluid opening (106) that is aligned with the inflation fluid outlet (70) of the second panel (32) for enabling flow of inflation fluid from the first bag section (30) into the second bag section (90).

13 Claims, 6 Drawing Sheets

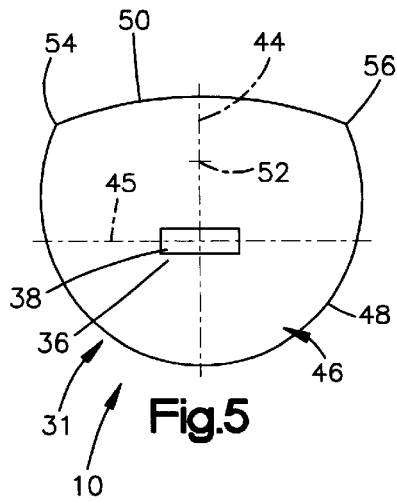
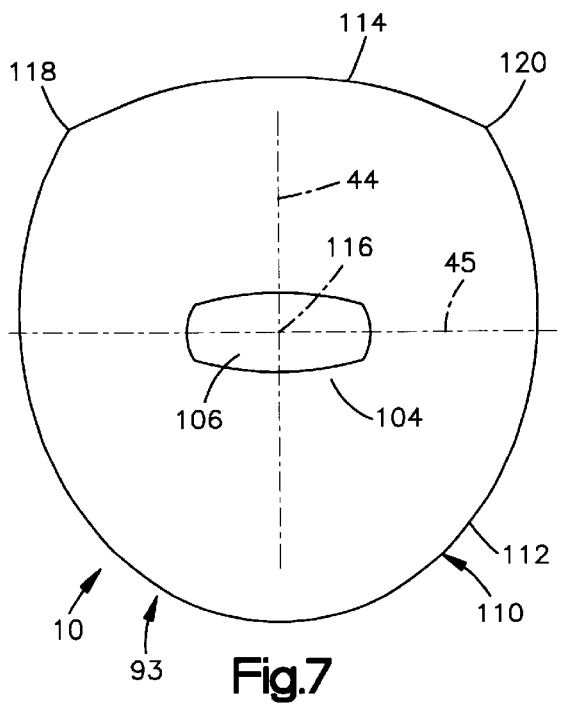
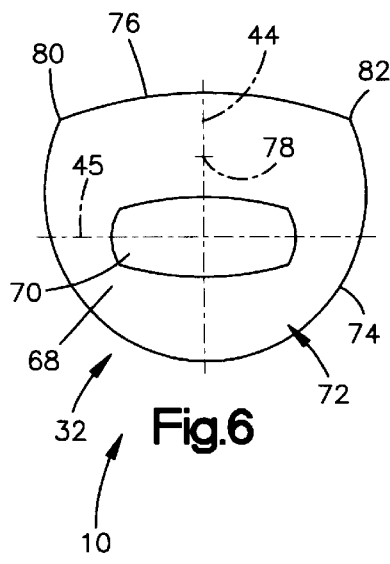
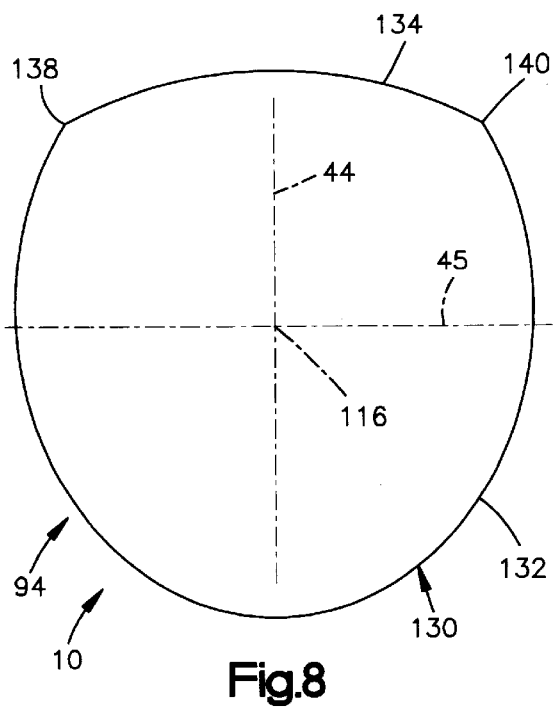

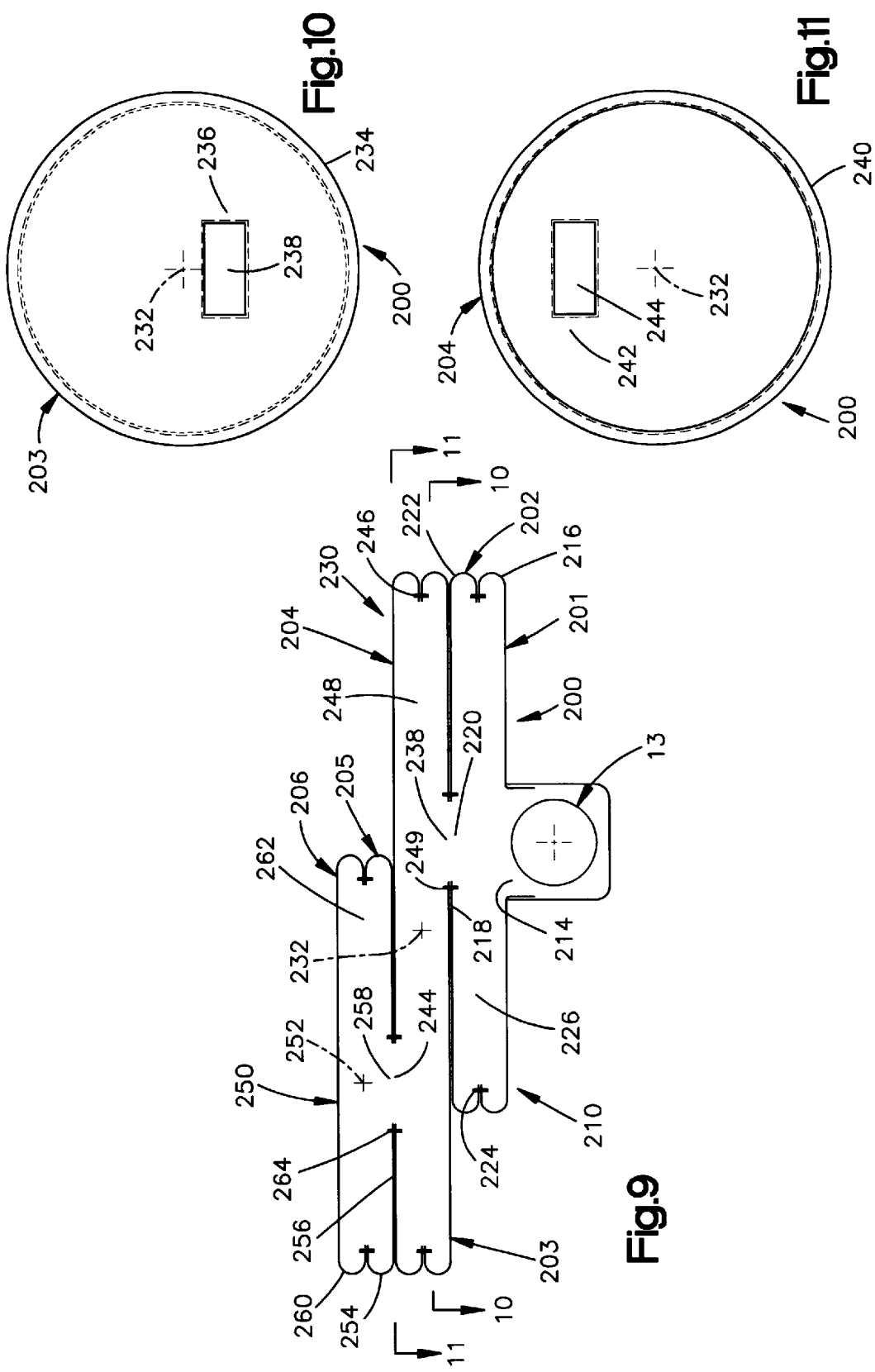

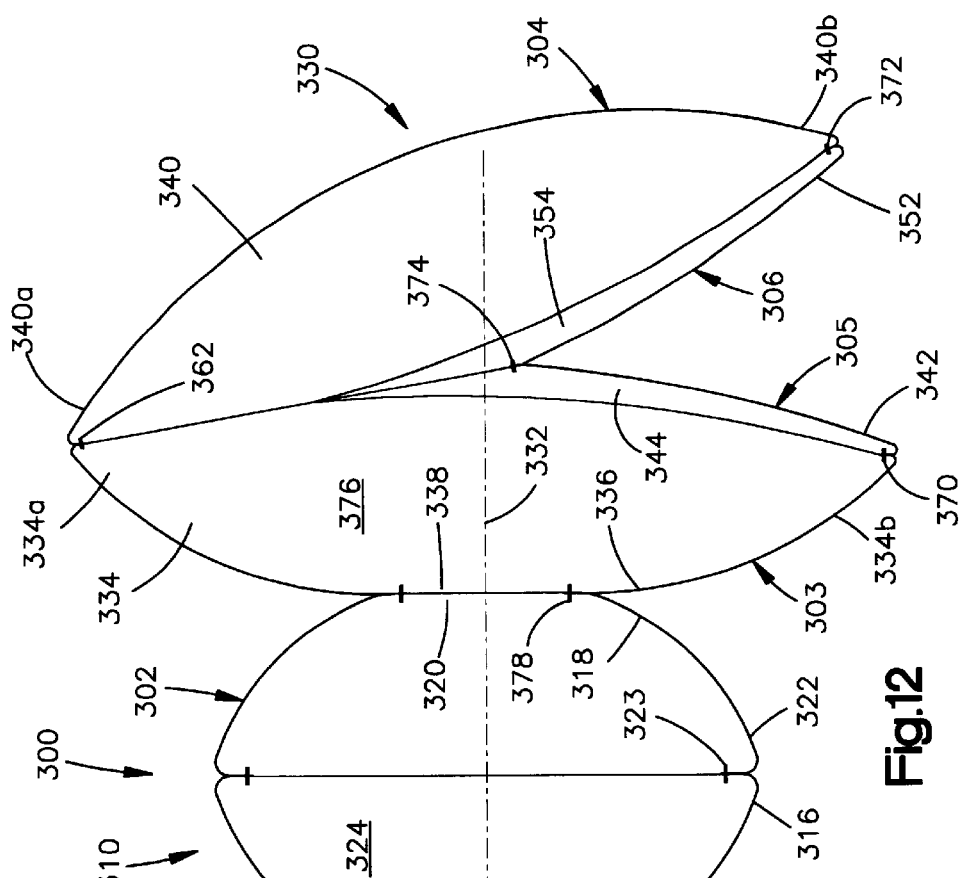
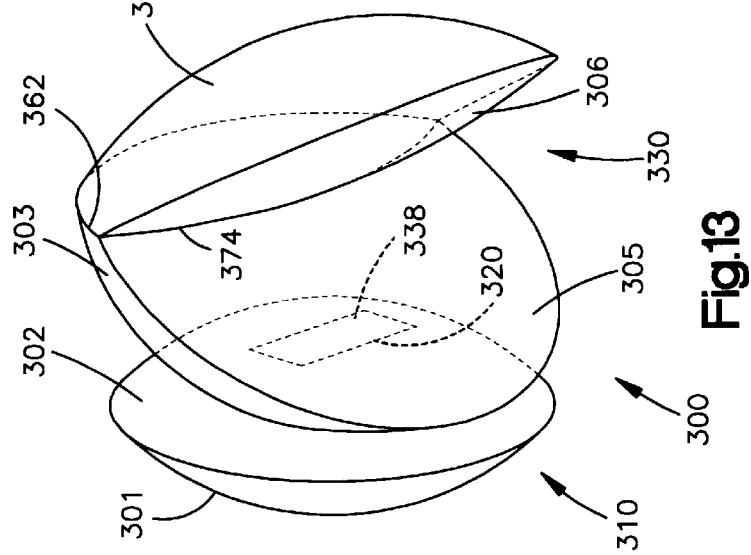

FOLDED AIR BAG

BACKGROUND OF THE INVENTION

1. Technical Field

The present invention relates to an inflatable vehicle occupant protection device, such as an air bag. In particular, the present invention relates to an air bag that can lie flat, when not inflated, to increase the ease of folding the air bag.

2. Description of the Prior Art

An air bag is typically made of a plurality of panels secured together, as by sewing. After the air bag is constructed, it needs to be folded into a compact shape for storage.

If an individual panel of an air bag is flat, that is, occupies a plane and has no significant curvature, inclination, elevation, or depression relative to that plane, the panel has a planar configuration, and can lie flat with no significant wrinkles. This feature makes it significantly easier to fold a flat panel as part of a completed air bag, in comparison to a panel that is not flat, that is, a panel that can not be made to lie in an essentially planar configuration with no wrinkles.

U.S. Pat. No. 6,086,092 discloses an air bag that includes a smaller air bag enclosed within a larger air bag. Inflation fluid is initially directed into the smaller air bag. When the smaller air bag fills, inflation fluid is directed from the smaller air bag into the larger air bag, to inflate the larger air bag. The smaller and larger air bags are both uniform in construction—each bag is made from two circular panels sewn together around their peripheries. Each one of the panels in the air bag is flat.

SUMMARY OF THE INVENTION

The present invention is an air bag for, when inflated, helping to protect an occupant of a vehicle. The air bag comprises first and second panels that are substantially identical to each other. The first and second panels are secured to each other to define a first bag section having a first inflation fluid volume. The first panel has an inflation fluid inlet for enabling flow of inflation fluid into the first bag section. The second panel has an outlet portion defining an inflation fluid outlet for enabling flow of inflation fluid out of the first bag section.

The air bag further comprises third and fourth panels that are substantially identical to each other. The third and fourth panels are secured to each other to define a second bag section having a second inflation fluid volume. The third panel is secured to the second panel and is spaced apart from the first panel. The third panel has a mouth portion defining an inflation fluid opening for enabling flow of inflation fluid into the second bag section. The mouth portion of the third panel is aligned with the inflation fluid outlet of the second panel for enabling flow of inflation fluid from the first bag section into the second bag section.

BRIEF DESCRIPTION OF THE DRAWINGS

Further features and advantages of the present invention will become apparent to those skilled in the art to which the present invention relates from a reading of the following detailed description with reference to the accompanying drawings, in which:

FIGS. 5–8 are plan views of individual panels that are part of the air bag of FIG. 1;

FIG. 9 is a view similar to FIG. 4 of an air bag that is a second embodiment of the invention;

FIG. 10 is a plan view of a first panel that is part of the air bag of FIG. 9;

FIG. 11 is a plan view of a second panel that is part of the air bag of FIG. 9;

FIG. 12 is a view similar to FIG. 4 of an air bag that is a third embodiment of the invention;

FIG. 13 is a schematic perspective view similar to FIG. 2 of the air bag of FIG. 12 in an inflated condition.

DETAILED DESCRIPTION OF THE INVENTION

Figure 1:
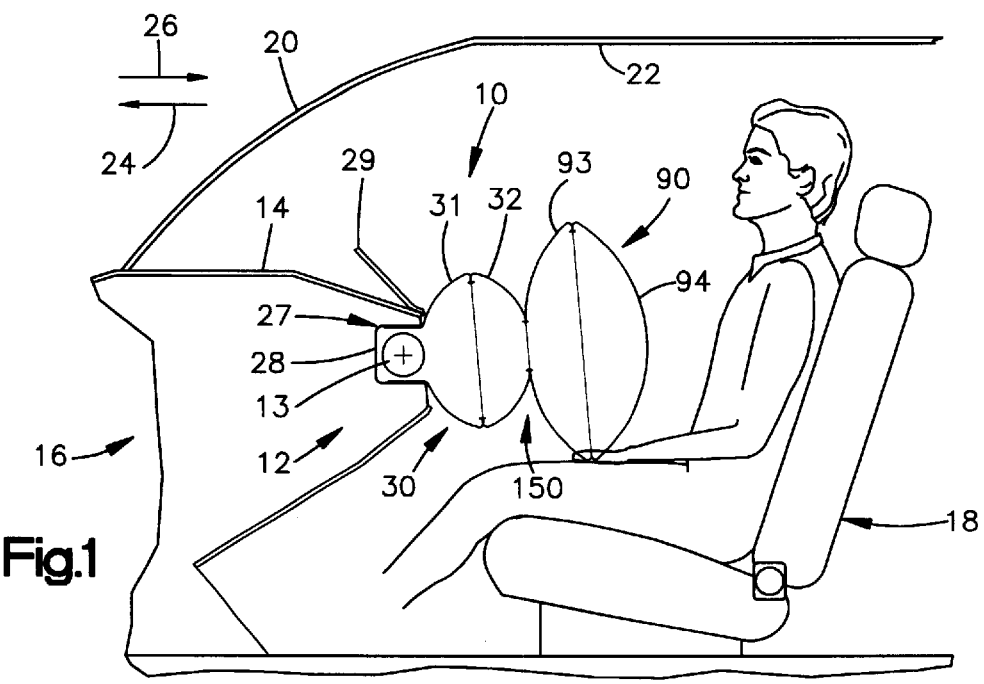
FIG. 1 is a schematic side view, partially in section, of a portion of a vehicle including an air bag in accordance with the present invention, shown in an inflated condition.

The present invention relates to an inflatable vehicle occupant protection device, such as an air bag. As representative of the invention, FIG. 1 illustrates an air bag 10. The air bag 10 forms part of an air bag module 12 mounted in the instrument panel 14 of a vehicle 16.

The air bag module 12 also includes an inflator 13 that contains an inflation fluid source for inflating the air bag 10. The inflation fluid source may be a stored quantity of pressurized inflation fluid and an ignitable material for heating the inflation fluid. The inflation fluid source alternatively could use the combustion of gas-generating material to generate inflation fluid in the form of gas to inflate the air bag 10, or could be a stored quantity of pressurized inflation fluid for inflating the air bag.

The vehicle 16 includes a front passenger seat 18 for an occupant of the vehicle. The vehicle windshield 20 extends upward and rearward from the instrument panel 14, and merges with the vehicle roof 22. In the vehicle 16, a forward direction is illustrated by the arrow 24, and a rearward direction by the arrow 26.

The air bag module 12 is mounted in a rearward facing location in the instrument panel 14. The air bag module 12 includes a container 27 secured in the instrument panel 14 in a manner not shown. The container 27 includes a main body portion 28 and a door 29. The door 29 is hinged to the main body portion 28 of the container 27 at the top of the container. It should be understood that the container 27 may have a different configuration from the one shown, or may be a portion of the instrument panel 14 itself. In addition, the invention is applicable to an air bag that is mounted elsewhere in the instrument panel, or in a door or seat or steering wheel or other location in a vehicle.

The air bag 10 includes a first air bag section 30. The first air bag section 30 includes a first panel 31 and a second panel 32 of the air bag 10.

As illustrated, the first panel 31 is made from a single piece of flexible fabric material, such as woven nylon. The first panel 31 could be made from more than one piece of material joined together and could be made from a different material than woven nylon.

The first panel 31 (FIG. 5) has a mouth portion 36 that extends around and defines an inflation fluid inlet 38 of the air bag 10. The inflation fluid inlet 38, as illustrated, is oblong in configuration, but could have a different shape. The inflation fluid inlet 38 extends between first and second opposite side surfaces 40 and 42 (FIG. 2) of the first panel 31.

The air bag 10 has first and second axes 44 and 45 that extend perpendicular to each other. The first panel 31 has an outer peripheral edge portion 46 that includes a first edge portion 48 and a second edge portion 50. The first edge portion 48 has an arcuate configuration centered on a point 52 on the first axis 44 spaced apart from the second axis 45. The first edge portion 48 has a first radius of curvature and forms about two thirds of a circle between its two end points 54 and 56.

The second edge portion 50 of the first panel 31 has a second radius of curvature that is substantially greater than the radius of curvature of the first edge portion 48. The second edge portion 50 intersects the first edge portion 48 at the end points 54 and 56 of the first edge portion, to form two corners of the first panel 31.

In the first panel 31, the first axis 44 and the second axis 45 extend through the inflation fluid inlet 38, and intersect at the center of the inflation fluid inlet. The first panel 31 is symmetrical about the first axis 44 but is not symmetrical about the second axis 45.

The first panel 31 is flat. Specifically, the first panel 31 can be placed in a planar configuration in which it has no significant curvature, inclinations, elevations, or depressions. As a result, the first panel 31, when laid on a table, for example, lies flat with no significant wrinkles. This feature of the first panel 31 makes it significantly easier to fold as part of the completed air bag 10, in comparison to a panel that is not flat, that is, a panel that can not be made to lie in an essentially planar configuration with no wrinkles.

The second panel 32 is substantially identical to the first panel 31, and, in the illustrated embodiment, made from the same material as the first panel. Two substantially identical panels may have different size inflation fluid openings, or inflation fluid openings that are located at different positions in otherwise identical panels, and still be "substantially identical".

The second panel 32, like the first panel 31, is flat, and has first and second opposite major side surfaces 60 and 62. The second panel 32 has an outlet portion 68 that extends around and defines an inflation fluid outlet 70. The inflation fluid outlet 70, as illustrated, is oblong in configuration, but could have a different shape. The inflation fluid outlet 70 extends between the first and second side surfaces 60 and 62 of the second panel 32.

The inflation fluid outlet 70, as illustrated, is larger than the inflation fluid inlet 38 of the first panel 31. The absolute and relative sizes of the inlet 38 and the outlet 70 are determined by the desired inflation characteristics of the air bag 10, and may vary from those shown.

The second panel 32 has an outer peripheral edge portion 72 that includes a first edge portion 74 and a second edge portion 76. The first edge portion 74 has an arcuate configuration centered on a point 78 on the first axis 44 spaced apart from the second axis 45. The first edge portion 74 has a first radius of curvature and forms about two thirds of a circle between its two end points 80 and 82.

The first axis 44 and the second axis 45 extend through the inflation fluid outlet 70, and intersect at the center of the inflation fluid outlet. The second panel 32 is symmetrical about the first axis 44 but is not symmetrical about the second axis 45.

The second edge portion 76 of the second panel 32 has a second radius of curvature that is substantially greater than the radius of curvature of the first edge portion 74. The second edge portion 76 intersects the first edge portion 74 at the end points 80 and 82 of the first edge portion, to form two corners of the second panel 32.

Figure 4:
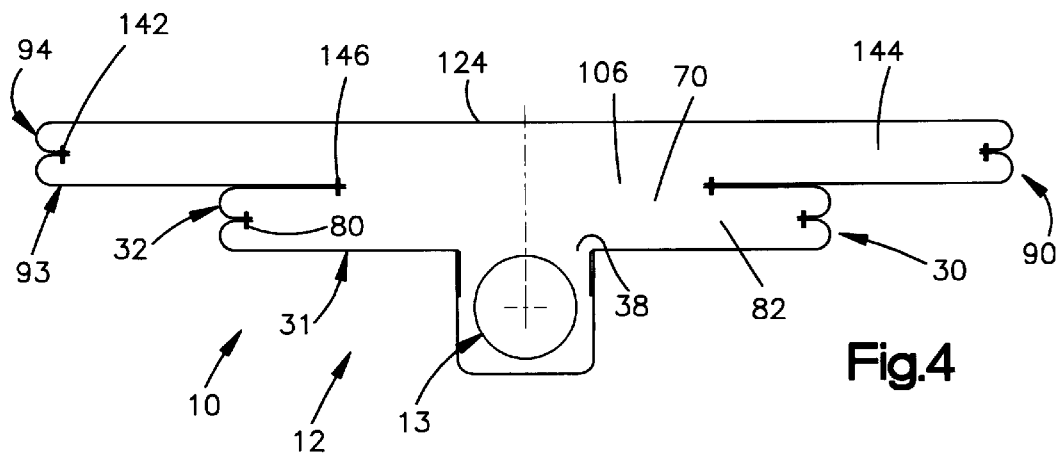
FIG. 4 is a schematic sectional view of the air bag of FIG. 1, taken along line 4—4 of FIG. 3.
Figure 14:
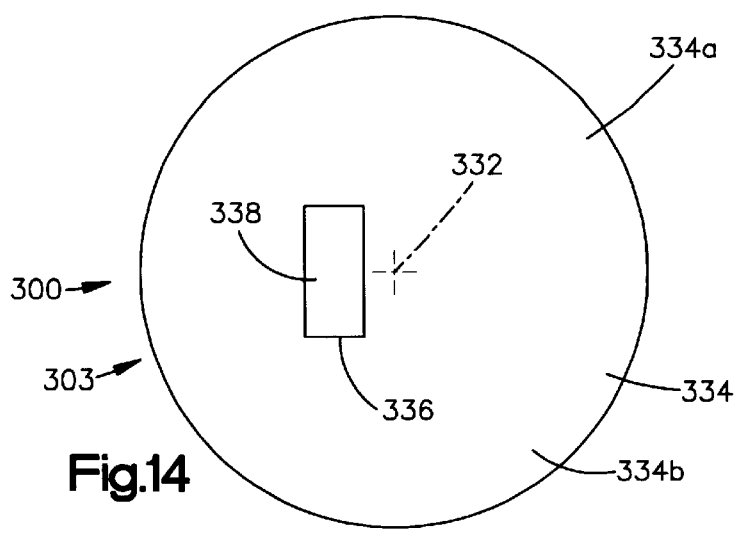
FIGS. 14–17 are plan views of individual panels that are part of the air bag of FIG. 12.
Figures 15, 16:
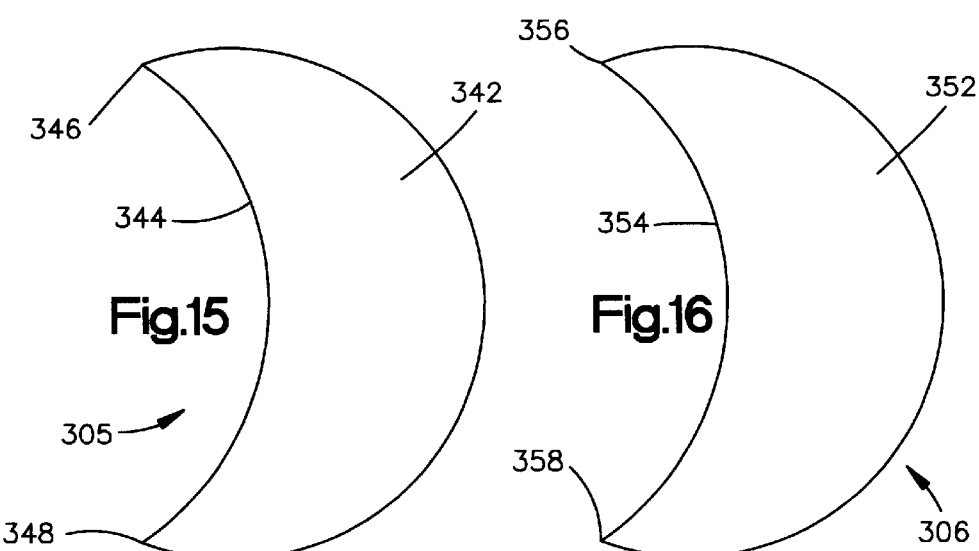
Figure 17:
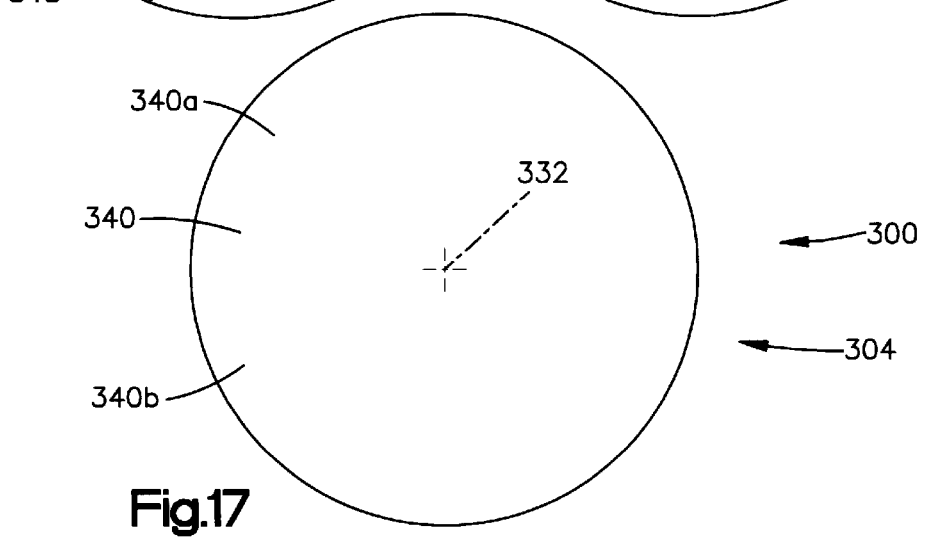

The first panel 31 and the second panel 32 are secured together to form the first air bag section 30, preferably by sewing as illustrated with a stitching section or seam 80 (FIG. 4) through their outer peripheral edge portions 46 and 72. Because both the first panel 31 and second panel 32 are flat, the first bag section 30, when uninflated, can be laid flat, with no wrinkles, as seen in FIG. 4.

The first air bag section 30 defines a first inflation fluid chamber 82. The first inflation fluid chamber 82 has a first volume. The inflation fluid inlet 38 in the first panel 31 enables flow of inflation fluid from the inflator 13 into the inflation fluid chamber 82 of the first air bag section 30. The inflation fluid outlet 70 enables flow of inflation fluid out of the inflation fluid chamber 82 of the first air bag section 30.

The air bag 10 includes a second air bag section 90 that is joined to the first section 30 as described below. The second air bag section 90 includes a third panel 93 and a fourth panel 94 of the air bag. The second air bag section 90 as illustrated is larger than the first air bag section 30. In other embodiments of the invention, the second air bag section 90 could be the same size as the first air bag section 30, or could be smaller than the first air bag section. In addition, the second air bag section 90 as illustrated is similar in configuration to the first air bag section 30, but could have a different configuration.

Figure 2:
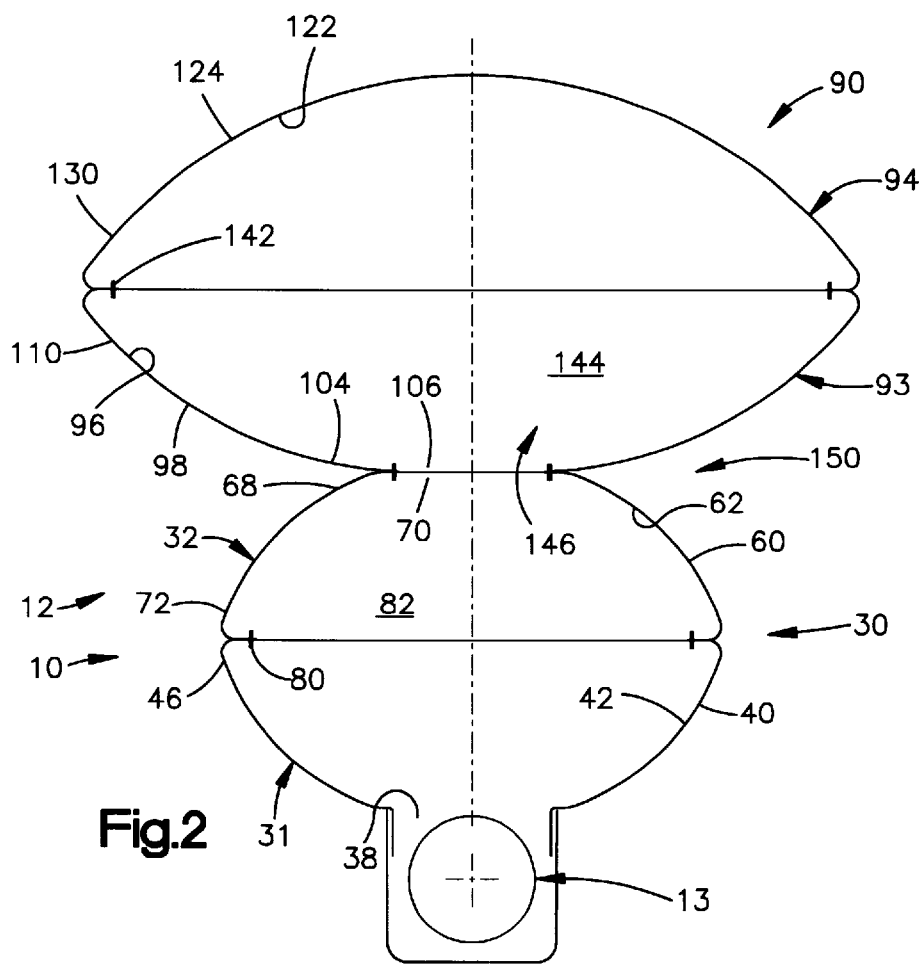
FIG. 2 is an enlarged view of the air bag of FIG. 1 in an inflated condition.
Figure 3:
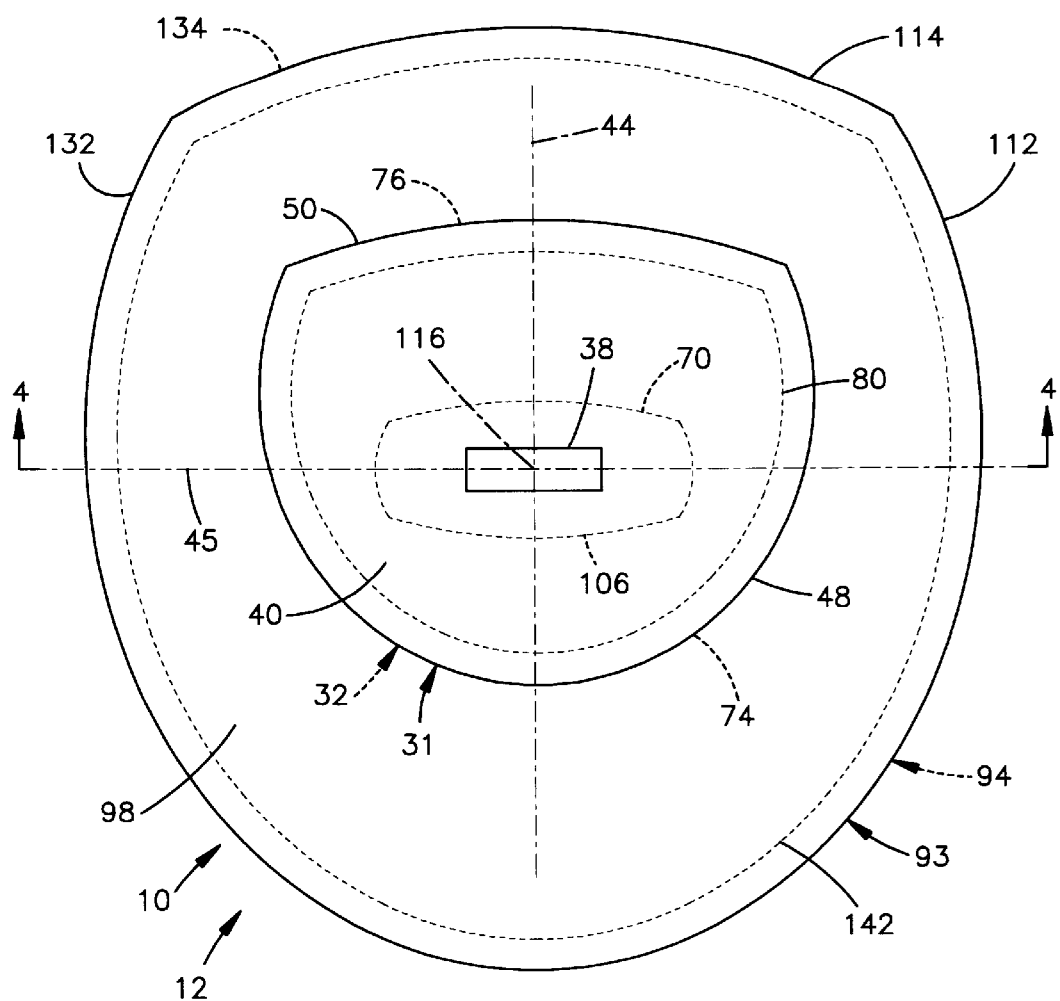
FIG. 3 is a schematic side view showing the air bag of FIG. 1 in an unfolded and uninflated condition.

The third panel 93 in the illustrated embodiment is similar in configuration to, but different in size from, the first panel 31 and the second panel 32. The third panel 93 is preferably made from the same material as the first and second panels 31 and 32. The third panel 93, like the first and second panels 31 and 32, is flat, and has first and second opposite major side surfaces 96 and 98 (FIG. 2).

The third panel 93 has a mouth portion 104 that extends around and defines an inflation fluid opening 106 of the air bag 10. The inflation fluid opening 106, as illustrated, is oblong in configuration, but could have a different shape and/or size. The inflation fluid opening 106 extends between the first and second side surfaces 96 and 98 of the third panel 93.

The third panel 93 has an outer peripheral edge portion 110 that includes a first edge portion 112 and a second edge portion 114. The first edge portion 112 has an elliptical configuration centered on a point 116 on the first axis 44, specifically, at the intersection with the second axis 45. The first edge portion 112 has a first radius of curvature that varies along its length. The first edge portion 112 forms about three quarters of an ellipse, between its two end points 118 and 120.

The second edge portion 114 of the third panel 93 has a second radius of curvature that is substantially greater than the first radius of curvature of the first edge portion 112. The second edge portion 114 intersects the first edge 112 at the end points 118 and 120 of the first edge portion, to form two corners of the third panel 93.

The first axis 44 and the second axis 45 of the air bag 10 extend through the inflation fluid opening 106, and intersect at the center of the inflation fluid opening. The third panel 93 is symmetrical about the first axis 44 but is not symmetrical about the second axis 45.

The fourth panel 94 is substantially identical to the third panel 93 and is made from the same material as the third panel 93. The fourth panel 94, like the third panel 93, is flat, and has first and second opposite major side surfaces 122 and 124 (FIG. 2). The second major side surface 124 forms an occupant contact surface of the air bag 10. This surface 124 is presented rearward in the vehicle 16 when the air bag 10 is fully inflated, and is the surface that is closest to the vehicle occupant when the air bag is inflated. The fourth panel 94 has no inflation fluid inlet or outlet openings.

The fourth panel 94 is symmetrical about the first axis 44 but is not symmetrical about the second axis 45. The fourth panel 94 has an outer peripheral edge portion 130 that includes a first edge portion 132 and a second edge portion 134. The first edge portion 132 has an elliptical configuration centered on the point 116 on the first axis 44 at the intersection with the second axis 45. The first edge portion 132 has a first radius of curvature that varies along its length. The first edge portion 132 forms about three quarters of an ellipse, between its two end points 138 and 140.

The second edge portion 134 of the fourth panel 94 has a second radius of curvature that is substantially greater than the first radius of curvature of the first edge portion 132. The second edge portion 134 intersects the first edge portion 132 at the end points 138 and 140 of the first edge portion, to form two corners of the fourth panel 94.

In the second air bag section 90, the third panel 93 overlies the fourth panel 94 when the air bag 10 is unfolded and uninflated as seen in FIGS. 4. The third panel 93 and the fourth panel 94 are secured together, preferably by sewing with a stitching section or seam 142 around their outer peripheries 110 and 130. The third panel 93 and the fourth panel 94 when thus secured together form the second air bag section 90 of the air bag 10.

The second air bag section 90 has a second inflation fluid chamber 144. The second inflation fluid chamber 144 has a second volume. The inflation fluid opening 106 in the third panel 93 enables flow of inflation fluid from the inflator 13 and the first air bag section 30 into the inflation fluid chamber 144 of the second air bag section 90. Because both the third panel 93 and the fourth panel 94 are flat, the second air bag section 90, when uninflated, can be laid flat, with no wrinkles, as seen in FIG. 4.

The second air bag section 90 is secured to the first air bag section 30. Specifically, the mouth portion 104 of the third panel 93 is secured to the outlet portion 68 of the second panel 32, preferably by sewing with a stitching section indicated schematically at 146. The stitching section 146 extends around the inflation fluid outlet 70 of the second panel 32 and around the inflation fluid opening 106 of the third panel 93. The inflation fluid outlet 70 of the second panel 32 overlies and is aligned with the inflation fluid opening 106 of the third panel 93.

When the second air bag section 90 is thus secured to the first air bag section 30 and the air bag 10 is inflated, the third panel 93 is spaced apart from the first panel 31. The third panel 93 is joined to, or connected with, the first panel 31 only through the second panel 32. The mouth portion 104 of the third panel 93 is spaced apart from the mouth portion 36 of the first panel 31, and also is spaced apart from the inflator 13.

FIG. 4 illustrates the air bag 10 in an uninflated and unfolded condition. The first panel 31 overlies the second panel 32. Both the first and second panels 31 and 32 lie flat, with no wrinkles.

The second panel 32 overlies the third panel 93. The inflation fluid outlet 70 in the second panel 32 is aligned with, or overlies, the inflation fluid opening 106 in the third panel 93. As a result, fluid communication is established between the first chamber 82 in the first air bag section 30 and the second chamber 144 in the second air bag section 90.

The third panel 93 overlies the fourth panel 94. Both the third and fourth panels 93 and 94 lie flat, with no wrinkles. Because all four panels 31, 32, 93 and 94 lie flat, with no wrinkles, the air bag 10 is easier to fold than if one or more of its panels did not lie flat but instead had wrinkles in it.

In the event it is desired to help protect the vehicle occupant with the air bag 10, the inflator 13 is actuated and directs inflation fluid under pressure into the air bag through the inflation fluid inlet 38. The inflation fluid flows into the first chamber 82 in the first bag section 30.

The pressure in the first bag section 30 increases, and the first bag section 30 begins to inflate. At the same time, some inflation fluid flows out of the first bag section 30, through the inflation fluid outlet 70 and the inflation fluid opening 106, into the second chamber 144 in the second bag section 90. The second bag section 90 begins to inflate. The occupant contact surface 124 moves rearward in the vehicle 16, into a position to help protect an occupant of the vehicle.

In the air bag 10, at the location 150 (FIG. 1) where the first air bag section 30 is secured to the second air bag section 90, the width and height of the air bag are less than they are at locations forward and rearward of that location. As a result, the volume of the air bag 10 is less than the volume of an air bag that has the same overall vertical and horizontal extent but that increases continuously in width and height as measured in a direction moving away from the inflator 13. This reduced volume of the air bag 10 can mean that less inflation fluid is needed to inflate the air bag, and a smaller or less powerful inflator can be used.

In addition, cutting a plurality of flat panels from a larger piece of material usually entails less material wastage than does cutting a plurality of panels that are not flat. Because each of the panels 31, 32, 93 and 94 of the air bag 10 is flat, this can mean that there is less waste when cutting these panels, so that the air bag 10 uses less fabric.

FIGS. 9–11 illustrate an air bag 200 that is a second embodiment of the present invention. The air bag 200 includes a first air bag section 210. The first air bag section 210 includes a first panel 201 and a second panel 202 that are substantially identical to each other.

The first panel 201 is flat, and has a mouth portion that extends around and defines an inflation fluid inlet 214 of the air bag 200. The first panel 201 has an outer peripheral edge portion 216.

The second panel 202 is substantially identical to the first panel 201 and is made from the same material as the first panel. The second panel 202, like the first panel 201, is flat. The second panel 202 has a mouth portion 218 that extends around and defines an inflation fluid outlet 220. The second panel 202 has an outer peripheral edge portion 222.

The first panel 201 and the second panel 202 are secured together to form the first air bag section 210. The first panel 201 and the second panel 202 are secured together, preferably by sewing, as illustrated, with a stitching section or seam 224 around their outer peripheries 216 and 222.

The first air bag section 210 defines a first inflation fluid chamber 226. The first inflation fluid chamber 226 has a first volume. The inflation fluid inlet 214 in the first panel 201 enables flow of inflation fluid from the inflator 13 into the inflation fluid chamber 226 of the first air bag section 210. The inflation fluid outlet 220 enables flow of inflation fluid out of the inflation fluid chamber 226 of the first air bag section 210. Because both the first panel 201 and second panel 202 are flat, the first bag section 210, when uninflated, can be laid flat, with no wrinkles, as seen in FIG. 9.

The air bag 200 includes a second air bag section 230. The second air bag section 230 includes a third panel 203 and a fourth panel 204 of the air bag.

The third panel 203 has a circular configuration centered on an axis 232 (FIG. 10). The third panel 203 has an outer peripheral edge portion 234. The third panel 203 has a mouth portion 236 that extends around and defines an inflation fluid inlet 238. The inflation fluid inlet 238 is spaced apart from the center of the third panel 203 (vertically downward as viewed in FIG. 10).

The fourth panel 204 is substantially identical to the third panel 203 and has a circular configuration centered on the axis 232. The fourth panel 204 has an outer peripheral edge portion 240. The fourth panel 204 has a mouth portion 242 that extends around and defines an inflation fluid outlet 244. The inflation fluid outlet 244 is spaced apart from the center of the fourth panel 204 (vertically upward as viewed in FIG. 11).

In the second air bag section 230, the third panel 203 overlies the fourth panel 204. The third panel 203 and the fourth panel 204 are secured to each other, preferably by sewing with a stitching section or seam 246 around their outer peripheries 234 and 240. The third panel 203 and the fourth panel 204 when thus secured together form the second air bag section 230 of the air bag 200. The second air bag section 230 defines a second inflation fluid chamber 248. The second inflation fluid chamber 248 has a second volume.

The second air bag section 230 is secured to the first air bag section 210. Specifically, the mouth portion 236 of the third panel 203 is secured to the mouth portion 218 of the second panel 202, preferably by sewing with a stitching section indicated schematically at 249. The stitching section 249 extends around the inflation fluid outlet 220 of the second panel 202 and around the inflation fluid inlet 238 of the third panel 203. The inflation fluid outlet 220 of the second panel 202 overlies and is aligned with the inflation fluid inlet 238 of the third panel 203.

When the second air bag section 230 is thus secured to the first air bag section 210 and the air bag 200 is inflated, the third panel 203 is spaced apart from the first panel 201. The third panel 203 is joined to, or connected with, the first panel 201 only through the second panel 202. The mouth portion 236 of the third panel 203 is spaced apart from the mouth portion of the first panel 201, and also is spaced apart from the inflator 13.

The inflation fluid opening 238 in the third panel 203 enables flow of inflation fluid from the inflator 13 and the first air bag section 210 into the inflation fluid chamber 248 of the second air bag section 230. The inflation fluid outlet 244 enables flow of inflation fluid out of the inflation fluid chamber 248 of the second air bag section 230.

Because both the third panel 203 and the fourth panel 204 are flat, the second air bag section 230, when uninflated, can be laid flat, with no wrinkles, as seen in FIG. 9. When the third panel 203 overlies the fourth panel 204, the inflation fluid inlet 238 in the third panel does not overlie, and is not aligned with, the inflation fluid outlet 244 in the fourth panel.

The air bag 200 includes a third air bag section 250. The third air bag section 250 includes a fifth panel 205 and a sixth panel 206 of the air bag 200.

The fifth panel 205 has a circular configuration centered on an axis 252. The fifth panel 205 has an outer peripheral edge portion 254 and a mouth portion 256 that extends around and defines an inflation fluid inlet 258. The sixth panel 206 is substantially identical to the fifth panel 205 and has a circular configuration centered on the axis 252 with an outer peripheral edge portion 260.

In the third air bag section 250, the fifth panel 205 overlies the sixth panel 206. The fifth panel 205 and the sixth panel 206 are secured to each other, preferably by sewing with a stitching section or seam around their outer peripheries 254 and 260. The fifth panel 205 and the sixth panel 206 when thus secured together form the third air bag section 250 of the air bag 200. The third air bag section 250 defines a third inflation fluid chamber 262. The third inflation fluid chamber 262 has a third volume.

The third air bag section 250 is secured to the second air bag section 230. Specifically, the mouth portion 256 of the fifth panel 205 is secured to the mouth portion 242 of the fourth panel 204, preferably by sewing with a stitching section indicated schematically at 264. The stitching section 264 extends around the inflation fluid outlet 244 of the fourth panel 204 and around the inflation fluid inlet 258 of the fifth panel 205. The inflation fluid outlet 244 of the fourth panel 204 overlies and is aligned with the inflation fluid inlet 258 of the fifth panel 205.

The inflation fluid opening 258 in the fifth panel 205 enables flow of inflation fluid from the inflator 13, through the first air bag section 210 and the second air bag section 230, into the inflation fluid chamber 262 of the third air bag section 250. Because the fifth panel 205 and the sixth panel 206 are flat, the third air bag section 250, when uninflated, can be laid flat, with no wrinkles, as seen in FIG. 9.

FIGS. 12–17 illustrate an air bag 300 that is a third embodiment of the present invention. The air bag 100 includes a first air bag section 310. The first air bag section 310 includes a first panel 301 and a second panel 302 that are substantially identical to each other.

The first panel 301 (FIG. 2) is flat, and has a mouth portion 312 that extends around and defines an inflation fluid inlet 314 of the air bag 300. The first panel 301 has an outer peripheral edge portion 316.

The second panel 302 (FIG. 1) is substantially identical to the first panel 301 and is made from the same material as the first panel. The second panel 302, like the first panel 301, is flat. The second panel 302 has a mouth portion that extends around and defines an inflation fluid outlet 320. The second panel 302 has an outer peripheral edge 322.

In the first air bag section 310, the first panel 301 overlies the second panel 302. The first panel 301 and the second panel 302 are secured together, preferably by sewing, as illustrated, with a stitching section or seam 323 around their outer peripheries 316 and 322.

The first air bag section 310 defines a first inflation fluid chamber 324. The first inflation fluid chamber 324 has a first volume. The inflation fluid inlet 314 in the first panel 301 enables flow of inflation fluid from the inflator 13 into the inflation fluid chamber 324 of the first air bag section 310. The inflation fluid outlet 320 in the second panel 302 enables flow of inflation fluid out of the inflation fluid chamber 324 of the first air bag section 310. Because both the first panel 301 and second panel 302 are flat, the first bag section 310, when uninflated, can be laid flat, with no wrinkles, as seen in FIG. 12.

The air bag 300 includes a second air bag section 330. The second air bag section 330 includes a third panel 303, a fourth panel 304, a fifth panel 305, and a sixth panel 306 of the air bag 300.

The third panel 303 has a circular configuration centered on an axis 332. The third panel 303 has a circular outer peripheral edge portion 334 with an upper part 334a and a lower part 334b. The third panel 303 has a mouth portion 336 that extends around and defines an inflation fluid inlet 338 of the air bag 300.

The fourth panel 304 is substantially identical to the third panel 303. The fourth panel 304 has a circular configuration centered on the axis 332. The fourth panel 304 has an outer peripheral edge portion 340 with an upper part 340a and a lower part 340b.

The fifth and sixth panels 305 and 306 have the same configuration as each other, but a different configuration from that of the third and fourth panels 303 and 304. Specifically, the fifth panel 305 has a crescent-shaped configuration including arcuate first and second edge portions 342 and 344 that meet at two corners 346 and 348 of the fifth panel 305. The first edge portion 342 has the same radius of curvature as the edge portion 334 of the third panel 303. The second edge portion 344 has a larger radius of curvature than the first edge portion 342.

The sixth panel 306 is substantially identical to the fifth panel 305 and has a crescent-shaped configuration including arcuate first and second edge portions 352 and 354. The first edge portion 352 has the same radius of curvature as the edge portion 340 of the fourth panel 304. The second edge portion 354 has a larger radius of curvature than the first edge portion 352. The two edge portions 352 and 354 meet at two corners 356 and 358 of the sixth panel 306.

In the second air bag section 330, the third panel 303 overlies the fourth panel 304 and the fifth panel 305, the fourth panel overlies the sixth panel 306, and the fifth panel 305 overlies the sixth panel 306. The upper part of the edge portion 334 of the third panel 303 is secured, preferably by a stitching section as shown at 362, to the upper part 340a of the edge portion 340 of the fourth panel 304. The lower part 334b of the edge portion 334 of the third panel 303 is not sewn to the lower part 340b of the edge portion 340 of the fourth panel 304. Rather, the fifth and sixth panels 305 and 306 are interposed between the lower part 334b of the edge portion 334 of the third panel 303 and the lower part 340b of the edge portion 364 of the fourth panel 304.

Specifically, the first edge portion 342 of the fifth panel 305 is secured, preferably by a stitching section shown at 370, to the lower part 334b of the edge portion 334 of the third panel 303.

The first edge portion 352 of the sixth panel 306 is secured, preferably by a stitching section shown at 372, to the lower part 340b of the edge portion 340 of the fourth panel 304.

Also, the second edge portion 344 of the fifth panel 305 is secured, preferably by a stitching section shown at 374, to the similar second edge portion 354 of the sixth panel 306, thus joining the fifth panel to the sixth panel.

The third, fourth, fifth and sixth panels 303–306 when thus secured together form the second air bag section 330 of the air bag 300. The second air bag section 330 has a pleated or accordion-like configuration along its lower part. The second air bag section 330 has a second inflation fluid chamber 376. The second inflation fluid chamber 376 has a second volume.

The second air bag section 330 is secured to the first air bag section 310. Specifically, the mouth portion 336 of the third panel 303 is secured to the mouth portion 318 of the second panel 302, preferably by sewing with a stitching section indicated schematically at 378. The stitching section 378 extends around the inflation fluid outlet 320 of the second panel 302 and around the inflation fluid inlet 338 of the third panel 303. The inflation fluid outlet 320 of the second panel 302 overlies and is aligned with the inflation fluid inlet 338 of the third panel 303.

When the second air bag section 330 is thus secured to the first air bag section 310 and the air bag 300 is inflated, the third panel 303 is spaced apart from the first panel 301. The third panel 303 is joined to, or connected with, the first panel 301 only through the second panel 302. The mouth portion 336 of the third panel 303 is spaced apart from the mouth portion 312 of the first panel 301, and also is spaced apart from the inflator 13.

The inflation fluid opening 338 in the third panel 303 enables flow of inflation fluid from the inflator 13, through the first air bag section 310, into the inflation fluid chamber 376 of the second air bag section 330. Because the third, fourth, fifth and sixth panels 303–306 are flat, the second air bag section 330, when uninflated, can be laid flat, with no wrinkles.

From the above description of the invention, those skilled in the art will perceive improvements, changes and modifications in the invention. For example, an air bag in accordance with the invention could have one or more vent holes in one or more of its panels, to vent inflation fluid from the air bag as desired. Such improvements, changes and modifications within the skill of the art are intended to be covered by the appended claims.

Having described the invention, I claim:

1. An air bag for helping to protect an occupant of a vehicle when inflated, said air bag comprising:

first and second panels that are substantially identical to each other, said first and second panels being secured to each other to define a first air bag section having a first inflation fluid volume;

said first panel having an inflation fluid inlet for enabling flow of inflation fluid into said first air bag section;

said second panel having an outlet portion defining an inflation fluid outlet for enabling flow of inflation fluid out of said first air bag section;

third and fourth panels that are substantially identical to each other, said third and fourth panels being secured to each other to define at least partially a second air bag section having a second inflation fluid volume;

said third panel being secured to said second panel and being spaced apart from said first panel when said air bag is inflated, said third panel having a mouth portion defining an inflation fluid opening for enabling flow of inflation fluid into said second air bag section;

said inflation fluid opening of said third panel being aligned with said inflation fluid outlet of said second panel for enabling flow of inflation fluid from said first air bag section into said second air bag section.

2. An air bag as set forth in claim 1 wherein said first and second panels are secured to each other at their peripheries and said third and fourth panels are secured to each other at their peripheries.

3. An air bag as set forth in claim 1 wherein said third and fourth panels are larger than said first and second panels.

4. An air bag as set forth in claim 1 wherein said mouth portion of said third panel is sewn to said outlet portion of said second panel and extends around said outlet portion of said second panel.

5. An air bag as set forth in claim 1 wherein said air bag has an unfolded and uninflated condition in which said first and second panels overlie each other and are flat, and said third and fourth panels overlie each other and are flat.

6. An air bag as set forth in claim 1 wherein said second panel has first and second axes, said mouth portion of said second panel being centered on at least one of said axes.

7. An air bag for helping to protect an occupant of a vehicle when inflated, said air bag comprising:

first and second panels that are substantially identical to each other, said first and second panels being secured to each other to define a first air bag section having a first inflation fluid volume;

said first panel having an inflation fluid inlet for enabling flow of inflation fluid into said first air bag section;

said second panel having an outlet portion defining an inflation fluid outlet for enabling flow of inflation fluid out of said first air bag section;

third and fourth panels that are substantially identical to each other, said third and fourth panels being secured to each other to define at least partially a second air bag section having a second inflation fluid volume;

said third panel being secured to said second panel and being spaced apart from said first panel when said air bag is inflated, said third panel having a mouth portion defining an inflation fluid opening for enabling flow of inflation fluid into said second air bag section;

said inflation fluid opening of said third panel being aligned with said inflation fluid outlet of said second panel for enabling flow of inflation fluid from said first air bag section into said second air bag section;

wherein said fourth panel has a second inflation fluid outlet, and further comprising fifth and sixth panels that are substantially identical to each other, said fifth and sixth panels being secured to each other to define at least partially a third air bag section having a third inflation fluid volume;

said fifth panel being secured to said fourth panel and being spaced apart from said first panel when said air bag is inflated, said fifth panel having a mouth portion defining an inflation fluid opening for enabling flow of inflation fluid into said third air bag section;

said inflation fluid opening of said fifth panel being aligned with said second inflation fluid outlet in said fourth panel for enabling flow of inflation fluid from said second air bag section into said third air bag section.

8. An air bag as set forth in claim 7 wherein said air bag has an unfolded and uninflated condition in which said first and second panels overlie each other and are flat, and said third and fourth panels overlie each other and are flat, and said fifth and sixth panels overlie each other and are flat.

9. An air bag as set forth in claim 7 wherein said inflation fluid outlet in said fourth panel is not aligned with and does not overlie said inflation fluid inlet in said third panel when said inflatable devices is in an uninflated and unfolded condition.

10. An air bag for helping to protect an occupant of a vehicle when inflated, said air bag comprising:

first and second panels that are substantially identical to each other, said first and second panels being secured to each other to define a first air bag section having a first inflation fluid volume;

said first panel having an inflation fluid inlet for enabling flow of inflation fluid into said first air bag section;

said second panel having an outlet portion defining an inflation fluid outlet for enabling flow of inflation fluid out of said first air bag section;

third and fourth panels that are substantially identical to each other, said third and fourth panels being secured to each other to define at least partially a second air bag section having a second inflation fluid volume;

said third panel being secured to said second panel and being spaced apart from said first panel when said air bag is inflated, said third panel having a mouth portion defining an inflation fluid opening for enabling flow of inflation fluid into said second air bag section;

said inflation fluid opening of said third panel being aligned with said inflation fluid outlet of said second panel for enabling flow of inflation fluid from said first air bag section into said second air bag section;

further comprising fifth and sixth panels that are substantially identical to each other;

said fifth and sixth panels being secured to each other between a portion of said third panel and a portion of said fourth panel to define, together with said third and fourth panels, said second air bag section;

said fifth panel being secured between said sixth panel and said third panel, said sixth panel being secured between said fifth panel and said fourth panel.

11. An air bag as set forth in claim 10 wherein said inflatable device has an unfolded and uninflated condition in which said first and second panels overlie each other and are flat, and said third and fourth panels overlie each other and are flat, and said fifth and sixth panels overlie each other and are flat.

12. An air bag for helping to protect an occupant of a vehicle when inflated, said air bag comprising:

first and second panels that are substantially identical to each other, said first and second panels being secured to each other to define a first air bag section having a first inflation fluid volume;

said first panel having an inflation fluid inlet formed by an opening in said first panel for enabling flow of inflation fluid into said first air bag section;

said second panel having an outlet portion defining an inflation fluid outlet for enabling flow of inflation fluid out of said first air bag section;

third and fourth panels that are substantially identical to each other, said third and fourth panels being secured to each other to define at least partially a second air bag section having a second inflation fluid volume, said second air bag section being located outside of said first air bag section, said first air bag section being located outside of said second air bag section;

said third panel being secured to said second panel and being spaced apart from said first panel when said air bag is inflated, said third panel having a mouth portion defining an inflation fluid opening for enabling flow of inflation fluid into said second air bag section;

said inflation fluid opening of said third panel overlying and being aligned with said inflation fluid outlet of said second panel for enabling flow of inflation fluid from said first air bag section into said second air bag section.

13. An air bag as set forth in claim 12 wherein said first panel has an outer peripheral edge portion and has a mouth portion inward of said outer peripheral edge portion, said mouth portion extending around and defining said inflation fluid inlet.

* * * * *